US012315918B2

(12) United States Patent
Kang et al.

(10) Patent No.: US 12,315,918 B2
(45) Date of Patent: *May 27, 2025

(54) SECONDARY BATTERY, PROCESS FOR PREPARING THE SAME AND APPARATUS CONTAINING THE SECONDARY BATTERY

(71) Applicant: Contemporary Amperex Technology (Hong Kong) Limited, Hong Kong (CN)

(72) Inventors: Meng Kang, Ningde (CN); Jiazheng Wang, Ningde (CN); Xiaobin Dong, Ningde (CN); Libing He, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,083

(22) Filed: Mar. 31, 2023

(65) Prior Publication Data

US 2023/0253562 A1      Aug. 10, 2023

Related U.S. Application Data

(63) Continuation of application No. 17/566,691, filed on Dec. 31, 2021, now Pat. No. 11,646,416, which is a continuation of application No. PCT/CN2020/088458, filed on Apr. 30, 2020.

(51) Int. Cl.

| | |
|---|---|
| *H01M 4/36* | (2006.01) |
| *H01M 4/04* | (2006.01) |
| *H01M 4/133* | (2010.01) |
| *H01M 4/1393* | (2010.01) |
| *H01M 4/583* | (2010.01) |
| *H01M 4/587* | (2010.01) |
| *H01M 4/02* | (2006.01) |
| *H01M 4/64* | (2006.01) |
| *H01M 10/0525* | (2010.01) |

(52) U.S. Cl.
CPC ............ *H01M 4/366* (2013.01); *H01M 4/04* (2013.01); *H01M 4/133* (2013.01); *H01M 4/1393* (2013.01); *H01M 4/583* (2013.01); *H01M 4/587* (2013.01); *H01M 2004/021* (2013.01); *H01M 2004/027* (2013.01); *H01M 4/64* (2013.01); *H01M 10/0525* (2013.01)

(58) Field of Classification Search
CPC ...... H01M 4/133; H01M 4/583; H01M 4/587; H01M 4/366; H01M 2004/027; H01M 2004/021; H01M 4/64; H01M 4/04; H01M 4/1393; H01M 10/0525
See application file for complete search history.

(56) References Cited

U.S. PATENT DOCUMENTS

| | | | | |
|---|---|---|---|---|
| 11,646,416 B2 * | 5/2023 | Kang | ............... | H01M 4/366 |
| | | | | 429/209 |
| 2014/0080004 A1 | 3/2014 | Imaji et al. | | |
| 2014/0287316 A1 * | 9/2014 | Ahn | ............... | H01M 4/587 |
| | | | | 429/231.8 |
| 2018/0062158 A1 * | 3/2018 | Kim | ............... | H01M 4/366 |
| 2018/0287145 A1 | 10/2018 | Lee et al. | | |

FOREIGN PATENT DOCUMENTS

| | | |
|---|---|---|
| CN | 104126242 A | 10/2014 |
| CN | 108140810 A | 6/2018 |
| CN | 110112366 A | 8/2019 |
| CN | 110867560 A | 3/2020 |
| EP | 3252853 A1 | 12/2017 |
| JP | 2004087251 A | 3/2004 |
| JP | 2009064574 A | 3/2009 |
| JP | 5213015 B2 | 6/2013 |
| JP | 2015064975 A | 4/2015 |
| JP | 2015511389 A | 4/2015 |
| JP | 2020537324 A | 12/2020 |
| JP | 2021529417 A | 10/2021 |
| KR | 20140095980 A | 8/2014 |
| KR | 20170007140 A | 1/2017 |
| KR | 2017-0031439 | * 3/2017 |

(Continued)

OTHER PUBLICATIONS

Written Decision on Registration for Korean Application No. 10-2021-7030665, dated May 30, 2023, 6 pages.
The International Search Report for PCT Application No. PCT/CN2020/088458, dated Jan. 27, 2021, 15 pages.
The Extended European Search Report for EP Application No. 20930644.8, dated May 2, 2022, 10 pages.
The First Office Action for European Application No. 20930644.8, dated Nov. 4, 2022, 4 pages.
The First Office Action for Japanese Application No. 2021-554402, dated Jul. 4, 2022, 8 pages.

(Continued)

*Primary Examiner* — Laura Weiner
(74) *Attorney, Agent, or Firm* — East IP P.C.

(57) ABSTRACT

This application relates to a secondary battery, a process for preparing the same and an apparatus containing the secondary battery. In particular, the negative electrode plate comprises a negative current collector and a negative electrode film, wherein the negative electrode film comprises a first negative electrode film and a second negative electrode film, the first negative electrode film is comprises a first negative electrode active material, and the particle size uniformity of the first negative electrode active material is from 0.4 to 0.6; the second negative electrode film comprises a second negative electrode active material, and the particle size uniformity of the second negative electrode active material is from 0.25 to 0.45, and a ratio of the particle size uniformity of the first negative electrode active material to the particle size uniformity of the second negative electrode active material is from 1.05 to 1.9.

19 Claims, 3 Drawing Sheets

(56) References Cited

FOREIGN PATENT DOCUMENTS

| KR | 20170031439 A | 3/2017 |
|---|---|---|
| WO | 2020042571 A1 | 3/2020 |

OTHER PUBLICATIONS

The First Office Action for Korean Application No. 10-2021-7030665, dated Oct. 17, 2022, 10 pages.
The First Office Action for Indian Application No. 202117057335, dated Jan. 20, 2023, 6 pages.
Notice of Final Rejection for Korean Application No. 10-2021-7030665, dated Feb. 27, 2023, 11 pages.
The First Office Action for U.S. Appl. No. 17/566,691, dated Mar. 10, 2022, 13 pages.
Final Rejection for U.S. Appl. No. 17/566,691, dated Jun. 7, 2022, 9 pages.
Advisory Action for U.S. Appl. No. 17/566,691, dated Sep. 16, 2022, 5 pages.
The First Office Action after 1st RCE for U.S. Appl. No. 17/566,691, dated Nov. 14, 2022, 14 pages.
Malvern Instructions Ltd. "MasterSizer 3000 User Manual" MAN0474 Issue 2.1, dated Aug. 2013, 182 pages.

\* cited by examiner

SECONDARY BATTERY, PROCESS FOR PREPARING THE SAME AND APPARATUS CONTAINING THE SECONDARY BATTERY

CROSS-REFERENCE TO RELATED APPLICATION

This application is a continuation of U.S. patent application Ser. No. 17/566,691, filed on Dec. 31, 2021, which is now U.S. patent Ser. No. 11/646,416. The U.S. patent application Ser. No. 17/566,691 and the U.S. patent Ser. No. 11/646,416, are a continuation of International Application No. PCT/CN2020/088458, filed on Apr. 30, 2020. All of them are incorporated herein by reference in their entireties.

TECHNICAL FIELD

This application belongs to the field of electrochemical technology, and more specifically, relates to a secondary battery, a process for preparing the same and an apparatus containing the secondary battery.

BACKGROUND

The secondary battery is widely used in various consumer electronic products and electric vehicles due to its light weight, no pollution and no memory effect.

With the development of new energy vehicles, people put forward higher requirements for the cruising range of vehicles. This requires the secondary battery as an energy source to have a higher energy density. Meanwhile, a charging speed of a new energy vehicle is also a major obstacle to its rapid popularization. However, the high energy density and the quick charging performance of secondary batteries tend to be mutually exclusive and a high energy density design tends to adversely affect the quick charging performance of the battery. Therefore, how to improve the quick charging performance while having high energy density is a key challenge in the field of battery design.

In view of this, it is necessary to provide a secondary battery which can solve the above problems and has the characteristics of high energy density and good quick charging performance.

SUMMARY

In view of the technical problems in the background art, the present application provides a secondary battery and an apparatus including the same, which aims to achieve both good quick charging performance and cycle performance while the secondary battery has a high energy density.

In order to achieve the above object, a first aspect of the present application provides a secondary battery, comprising a negative electrode plate, wherein the negative electrode plate comprises a negative electrode current collector and a negative electrode film, and the negative electrode film comprises a first negative electrode film and a second negative electrode film; the first negative electrode film is disposed on at least one surface of the negative electrode current collector and comprises a first negative electrode active material, and the first negative electrode active material comprises graphite and has a particle size uniformity of from 0.4 to 0.6; and the second negative electrode film is disposed on the first negative electrode film and comprises a second negative electrode active material, and the second negative electrode active material comprises artificial graphite and has a particle size uniformity of from 0.25 to 0.45 and a ratio of the particle size uniformity of the first negative electrode active material to the particle size uniformity of the second negative electrode active material is from 1.05 to 1.9.

In the second aspect of this application, a process method for preparing a secondary battery is provided, comprising preparing a negative electrode plate of the secondary battery by the following steps:
1) forming a first negative electrode film comprising a first negative electrode active material on at least one surface of a negative electrode current collector, wherein the first negative electrode active material comprises graphite and has a particle size uniformity of from 0.4 to 0.6; and
2) forming a second negative electrode film comprising a second negative electrode active material on the first negative electrode film, wherein the second negative electrode active material comprises artificial graphite; and the second negative electrode active material has a particle size uniformity of from 0.25 to 0.45;

wherein a ratio of the particle size uniformity of the first negative electrode active material to the particle size uniformity of the second negative electrode active material is from 1.05 to 1.9.

In a third aspect of the present application, the present application also relates to an apparatus comprising a secondary battery according to the first aspect of the present application or a secondary battery prepared according to the process of the second aspect of the present application.

Over existing technologies, this application includes at least the following beneficial effects:

The negative electrode plate of the secondary battery in this application comprises a first negative electrode film and a second negative electrode film, and different compositions of negative electrode active materials in each negative electrode film are controlled during design, so that the secondary battery has good quick charging performance and cycle performance on the premise of higher energy density. The apparatus in this application comprises the secondary battery and thus has at least the same advantages as the secondary battery.

Figure 1:
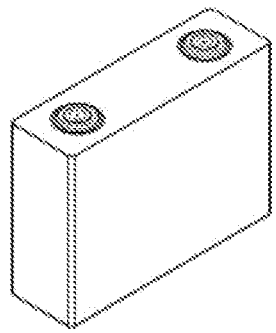
FIG. 1 shows a schematic diagram of an embodiment of a secondary battery in this application.

Herein the description of the appended drawing reference signs is as follows:
1 Battery pack
2 Upper cabinet body 3 Lower cabinet body
4 Battery module
5 Secondary battery
51 House
52 Electrode assembly
53 Cover plate
10 Negative electrode plate
101 Negative electrode current collector
102 Second negative electrode film
103 First negative electrode film

DETAILED DESCRIPTION

The application is further described in combination with specific embodiment as follows. It should be understood that these specific embodiments are used only to describe the application without limitation to its scope.

For the sake of brevity, the present application explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. The recitation of "more" in the phrase "one or more" includes two or more.

Unless otherwise stated, the terms used in this application have the common meaning known by technicians in this field. Unless otherwise stated, the values of the parameters mentioned in this application may be measured by various methods commonly used in this field, by the methods below given in the examples of this application, for example.

Secondary Battery

In the first aspect, the application in a first aspect provides a secondary battery. The secondary battery comprises a positive electrode plate, a negative electrode plate and an electrolyte. During battery charging and discharging, active ions are intercalated and deintercalated between positive and negative electrode plates. Electrolytes act as conducting ions between positive and negative electrode plates.

[Negative Electrode Plate]

In the secondary battery, in order to increase the energy density of the battery, the areal density and the compacted density of the film are often required to increase. Nevertheless, the increase in the areal density and the compacted density causes deterioration in the quick charging performance of the battery. This is because the migration path of active ions increases with the increase of areal density, and the pore structure of negative electrode deteriorates with the increase of compacted density, thus negatively affecting the liquid phase conduction of active ions. In addition, due to the expansion of the negative electrode active material in the circulation process, the adhesion force between the active material and the substrate decreases, and even the delamination occurs, which is more serious when the areal density increases. Therefore, how to obtain a battery with better quick charging performance and cycle performance while having higher energy density is a great challenge in the technical aspect.

Through a large number of experiments, the inventor found that the technical goal of this application can be achieved by adjusting the preparation process of the negative electrode plate. Specifically, the negative electrode plate in the secondary battery comprises a negative current collector and a negative electrode film, wherein the negative electrode film comprises a first negative electrode film and a second negative electrode film; the first negative electrode film is disposed on at least one surface of the negative current collector and comprises a first negative electrode active material, the first negative electrode active material comprises graphite, and has a particle size uniformity of from 0.4 to 0.6; the second negative electrode film is disposed on the first negative electrode film and comprises a second negative electrode active material, the second negative electrode active material comprises artificial graphite, and has a particle size uniformity of from 0.25 to 0.45.

In the present application, the particle size uniformity of the negative electrode active material has a meaning well known in the art, which can characterize a discrete extent of all particles in the negative electrode active material that has a particle size deviated from the volume distribution particle size $D_v50$, and can reflect the uniformity of the particle size distribution of the negative electrode active material.

Specifically, the negative electrode plate of this application includes a first negative electrode film and a second negative electrode film, and the upper layer and the lower layer respectively contain the specific negative electrode active materials, which are apparently different in the particle size uniformity. When the particle size uniformity of the first negative electrode active material is within the range of 0.4 to 0.6, and the particle size uniformity of the second negative electrode active material is within the range of 0.25 to 0.45, the secondary battery may have has better quick charging performance and cycle performance while having a higher energy density. The inventors researched and discovered that when the particle size uniformities of the first negative electrode active material and the second negative electrode active material are within given ranges respectively, the transmission paths of the active ions in the first negative electrode film and the second negative electrode film are optimally matched, the impedance of the active ions in liquid phase conduction is effectively reduced, the active ions in each region can quickly complete liquid phase conduction and are intercalated into the negative electrode active materials, thereby effectively improving and the quick charging performance of the battery; meanwhile, when the negative active materials of the above upper layer and the lower layer have the particle size uniformities in the respective specific ranges, proper contact surfaces are obtained among the negative active materials of the layers, between the negative film and the negative current collector, and between the first negative film and the second negative film in the manufactured secondary battery, and the risk of stripping of the negative films is reduced, thereby effectively improving the cycle performance of the battery.

The first negative electrode active material may have a particle size uniformity of 0.43 to 0.58, from 0.47 to 0.6, from 0.47 to 0.55, from 0.51 to 0.58 and the like. In some preferred embodiments, the first negative active material may have a particle size uniformity of from 0.45 to 0.6; more preferably from 0.5 to 0.57.

The second negative electrode active material may have a particle size uniformity of from 0.25 to 0.38, from 0.26 to 0.45, from 0.27 to 0.43, from 0.3 to 0.42, or the like. In some preferred embodiments, the second negative active material may have a particle size uniformity of from 0.3 to 0.4; more preferably from 0.32 to 0.38.

The present inventors have conducted intensive studies to find that, on the basis that the negative electrode plate of the present application satisfies the foregoing designs, the performance of the secondary battery can be further improved, in the event that it optionally satisfies one or more of the following designs.

In some preferred embodiments, a ratio of the particle size uniformity of the first negative electrode active material (uniformity) to the particle size uniformity of the second negative electrode active material (uniformity) is from 1.05 to 1.9, and more preferably from 1.2 to 1.6. When the ratio of the particle size uniformity of the upper and lower layers of negative electrode active materials meets the range, the negative electrode active materials in each layer are further optimized. After the negative electrode plates are manufactured, the upper and lower layers of negative electrode active materials are mutually moved and filled, which is advantageous to close packing among the negative electrode active materials, so that each negative electrode film has higher compacted density, the volume energy density of the battery is further improved. Therefore under the same design, the filling ratio of jelly roll to cell can of the battery is more advantageous, and the cycle performance of the battery is further improved.

In some preferred embodiments, the mass ratio of the artificial graphite in the second negative electrode active material≥80%, and more preferably, from 90% to 100%.

In some preferred embodiments, secondary particles are included in the second negative active material. Inventor finds that the active ion concentration of the region where the second negative electrode film is located is higher, and the situation that the active material in the second negative electrode film contains a certain amount of secondary particles, may provide more channels for deintercalated active ions, and is exactly matched with the actual distribution of the active ions in the region, so that the quick charging performance and the cycle performance of the battery can be further improved.

In some preferred embodiments, a ratio B by number of the secondary particles in the second negative electrode active material is ≥30%; more preferably, a ratio B by number 5 of the secondary particles in the secondary negative electrode active material is ≥50%. For example, the ratio B by number can be: 30%≤ B≤ 100%, 40%≤ B≤ 85%, 45%≤ B≤ 98%, 50%≤ B≤ 100%, 55%≤ B≤ 95%, 60% ≤ B≤ 98%, 80%≤ B≤ 100% or 50%≤ B≤ 90%.

In some preferred embodiments, the volume distribution particle size $D_V10$ of the first negative electrode active material is less than the volume distribution particle size $D_V10$ of the second negative electrode active material. When the negative electrode active materials of the upper layer and the lower layer meet the above design condition, the pore channel of the second negative electrode film tends to be linear, which is beneficial to liquid phase conduction of active ions in a low SOC State (State of charge) at the initial stage of charging, and meanwhile, the second negative electrode film has more small-particle active substances and smaller particle size, which is beneficial to charge exchange of the active ions in a high SOC State at the final stage of charging, so that the quick charging performance of the battery is further improved.

In some preferred embodiments, the volume distribution particle diameter $D_V10$ of the first negative electrode active material is from 4.8 μm to 8.0 μm, and more preferably from 5.3 μm to 7.3 μm.

In some preferred embodiments, the volume distribution particle diameter $D_V10$ of the second negative electrode active material is from 6.0 μm to 9.5 μm, and more preferably from 8 μm to 9 μm.

In some preferred embodiments, the tap density of the first negative electrode active material is greater than the tap density of the second negative electrode active material. The tap density can reflect the packing compactness of the active material in the film. When the tap density of the first negative electrode film is greater than the tap density of the second negative electrode active material, the first negative electrode film is packed more compactly, which can ensure the battery to have higher volume energy density, and the second negative electrode film is packed loosely, and pores are more developed, which can ensure the battery to have more excellent quick charging performance. Therefore, the battery has a higher volume energy density and a better quick charging performance at the same time. Because the volume energy density is higher, the group margin is more advantageous under the same design, thereby further improving the cycle performance of the battery.

In some preferred embodiments, the first negative electrode active material has a tap density of from 0.88 g/cm$^3$ to 1.28 g/cm$^3$, and more preferably from 0.98 g/cm$^3$ to 1.18 g/cm$^3$.

In some preferred embodiments, the second negative active material has a tap density of from 0.7 g/cm$^3$ to 1.4 g/cm$^3$, and more preferably from 0.8 g/cm$^3$ to 1.2 g/cm$^3$.

In some preferred embodiments, the first negative electrode active material has a particle size distribution $(D_V90-D_V10)/D_V50$ of from 1.2 to 2.4, and more preferably from 1.5 to 2.1.

In some preferred embodiments, the second negative electrode active material has a particle size distribution $(D_V90-D_V10)/D_V50$ of from 0.9 to 1.5, and more preferably from 1.1 to 1.3.

In some preferred embodiments, the volume distribution particle diameter $D_V50$ of the first negative electrode active material is from 13.7 μm to 20.7 μm, and more preferably from 14.7 μm to 18.7 μm.

In some preferred embodiments, the volume distribution particle diameter $D_V50$ of the second negative electrode active material is from 10 μm to 18 μm, and more preferably from 12 μm to 16 μm.

In some preferred embodiments, the volume distribution particle diameter $D_V99$ of the first negative electrode active material is from 42 μm to 66 μm, and more preferably from 48 μm to 60 μm.

In some preferred embodiments, the volume distribution particle diameter $D_V99$ of the second negative electrode active material is from 25 μm to 45 μm, and more preferably from 30 μm to 40 μm.

In some preferred embodiments, the powder compacted density of the first negative electrode active material at a pressure of 30,000N is from 1.77 g/cm$^3$ to 1.97 g/cm$^3$, and more preferably from 1.82 g/cm$^3$ to 1.92 g/cm$^3$.

In some preferred embodiments, the powder compacted density of the second negative electrode active material at a pressure of 30,000N is from 1.65 g/cm$^3$ to 1.85 g/cm$^3$, and more preferably from 1.71 g/cm$^3$ to 1.80 g/cm$^3$.

In the present application, the first negative electrode active material may include one or more of artificial graphite and natural graphite.

In some preferred embodiments, the first negative electrode active material includes artificial graphite.

In some preferred embodiments, the mass ratio of the artificial graphite in the first negative electrode active material is ≥50%, and more preferably, from 60% to 100%.

In some preferred embodiments, the thickness of the negative electrode film is ≥60 μm, and more preferably from 65 μm to 80 μm. It shall be noted that the thickness of the negative electrode film is the sum of the thicknesses of the first negative electrode film and the second negative electrode film.

In some preferred embodiments, the thickness ratio of the second negative electrode film to the first negative electrode film is from 1:1 to 3:2. When the thickness ratio of the first and second negative electrode films is within the given range, it is beneficial to form a gradient pore distribution in the upper and lower layers, which reduces the liquid phase conduction resistance of de-intercalated active ions from the positive electrode on the surface of the negative electrode film, and will not cause lithium precipitation caused by ion accumulation on the surface. Meanwhile, the uniform diffusion of active ions in the film is beneficial to reduce polarization, which can further improve the quick charging performance and cycle performance of the battery.

In some preferred embodiments, the areal density of the negative electrode film is from 90 g/m² to 136 g/m², preferably from 104 g/m² to 117 g/m². It is necessary to note that 25 the areal density of the negative electrode film refers to the areal density of the overall negative electrode film (that is, the sum of the areal density of the first negative electrode film and that of the second negative electrode film).

In some preferred embodiments, the negative electrode film has a compacted density of from 1.5 g/cm³ to 1.75 g/cm³, and more preferably from 1.6 g/cm³ to 1.7 g/cm³. Compacted density of the negative electrode film refers to the compacted density of the overall negative electrode film (i.e., the ratio of the areal density to the thickness of the negative electrode film). Compacted density of the negative electrode film is within the given range, so that the negative electrode plate has a low cycle expansion and good dynamic performance while having a high reversible capacity, thereby further improving the energy density, the quick charging capacity and the cycle performance of the battery.

In the present application, the particle size uniformity of the negative electrode active material has a meaning well known in the art and can be tested using a method known in the art. This can be directly measured, for example, by a laser diffraction particle size distribution tester (e.g., a Malvern Mastersizer 3000) according to standard GB/T19077.1-2016.

In the present application, the secondary particles have a meaning known in the art and refer to particles in an agglomerated state formed by aggregating two or more primary particles.

The number ratio of the secondary particles in the negative electrode active material can be measured by an apparatus and a method known in the art. For example, lay and adhere a negative electrode active material on a conductive adhesive to prepare a sample to be tested with a long* width of 6 cm×1.1 cm; and use a scanning electron microscope (e.g. ZEISS Sigma 300) to test the particle morphology. The test can be carried out with reference to JY/T010-1996. In order to ensure the accuracy of the test result, a plurality of (for example, 20) different areas can be randomly selected from the sample to be tested to perform the scan test, and under a certain magnification (for example, 1000 times), the percentage of the number of the secondary particles in each area to the total number of the particles is calculated, that is, the number ratio of the secondary particles in the area; the average value of the test results of the above-described plurality of test regions is taken as the number ratio of the secondary particles in the negative active material.

In the present application, $D_v10$, $D_v50$, $D_v90$, $D_v99$ of the negative electrode active material all have meanings known in the art and can be tested using methods known in the art. This can be directly measured, for example, by a laser diffraction particle size distribution tester (e.g., a Malvern Mastersizer 3000) with reference to the standard GB/T19077.1-2016. $D_v10$ refers to the corresponding particle size when the cumulative volume percentage of the negative electrode active material reaches 10%; $D_v50$ refers to the corresponding particle size when the cumulative volume percentage of the negative electrode active material reaches 50%; $D_v90$ refers to the corresponding particle size when the cumulative volume percentage of the negative electrode active material reaches 90%; and $D_v99$ refers to the corresponding particle size when the cumulative volume percentage of the negative electrode active material reaches 99%.

In the present application, the tap density of the negative electrode active material has a meaning well known in the art and can be tested using a method known in the art. For example, the test can be performed by using a powder tap density tester (such as the Dandong Baitt BT-301) with reference to the standard GB/T5162-2006.

In this application, the powder compacted density of the material has a common meaning in the art and can be tested by the method known in this field. For example, the test could be implemented with reference to GB/T 24533-2009 using an electronic pressure testing machine (such as UTM7305) as follows. Put a certain amount of powder on a special mold for compaction, set different pressure, read the thickness of the powder on the apparatus under different pressure, and calculate the compacted density under different pressure. In this application, the pressure is set to be 30,000N.

In this application, the graphitization degree of the negative electrode active material has a common meaning in this field and can be tested using methods already known in this field. For example the test could be performed using an X-ray diffractometer (e.g. Bruker D8 Discover). According to JIS K 0131-1996 and JB/T 4220-2011, the size of d002 can be measured, and then the graphitization degree can be calculated according to the formula $G=(0.344-d002)/(0.344-0.3354)\times 100\%$, where d002 is the interlayer spacing of graphite crystal structure in nm. CuKa rays are used as a radiation source in an X-ray diffraction analysis test, with a radiation wavelength of $\lambda=1.5418$ Å, a 2θ scanning range of from 20° to 80° s, and a scanning speed of 4°/min.

In this application, the morphology of the material has a common meaning in this field and can be tested using methods known in the field. For example, the morphology of the particles is tested by adhering the material to a conductive gel and using a scanning electron microscope (e.g., ZEISS Sigma 300). The tests may refer to JY/T 010-1996.

It should be noted that the above-mentioned various parameter tests for the negative electrode active material can perform by sampling and testing before coating, or can perform by sampling and testing from the negative electrode film through cold pressing.

If the above test samples are taken from the negative electrode film through cold pressing, as an example, they can be sampled as follows:

(1) Firstly, randomly select a cold-pressed negative electrode film, take samples of the second negative electrode active material by scraping powder (a blade can be used for sampling), and the depth of the powder scraping is not more than the boundary between the first negative electrode film and the second negative electrode film;

(2) Secondly, take samples of the first negative electrode active material. Since there may be an inter-fusion layer between the first negative electrode film and the second negative electrode film during the cold pressing process (in which inter-fusion layer the first active material and the second active material are both present), on sampling the first negative electrode active material, the inter-fusion layer can be scraped off first, and then the first negative electrode active material is scraped to sample for the accuracy of the measurement;

(3) Place the first negative electrode active material and the second negative electrode active material as collected above into the deionized water respectively, and filter the first negative electrode active material and the second negative electrode active material followed by drying, then sinter the dried negative electrode active material at a certain temperature and time (for example, at 400° C. for 2 h), and remove the binder and conductive carbon, so the test samples of the first negative electrode active material and the second negative electrode active material are obtained.

In the above sampling process, the boundary between the first negative electrode film and the second negative electrode film can be determined with an optical microscope or a scanning electron microscope.

Negative electrode active material used in the present application is commercially available.

In this application, the total thickness of the negative electrode film may be measured by a high-qualify micrometer. For example, the high-qualify micrometer of model Mitutoyo293-100 with a precision of 0.1 µm is applied for measurement.

In the present application, the thickness of the first and second negative electrode films may be tested by using a scanning electron microscope (e.g., ZEISS Sigma 300). The sample preparation is as follows: First, the negative electrode plate is cut into the test sample with a certain size (for example, 2 cm×2 cm), and the negative electrode plate is fixed on the sample table with paraffin. Then the sample table is placed onto the sample holder and well fixed. Open the power source of argon cross-section polisher (such as IB-19500CP) and vacuum (such as $10^{-4}$ Pa), set an argon flow (such as 0.15 MPa) and voltage (such as 8 KV) and a polishing period (such as 2 hours), and adjust the sample holder to start polishing in a swing mode. For sample testing, refer to JY/T 010-1996. To ensure the accuracy of the test results, several (for example, 10) different areas in the test samples may be randomly selected for scanning and test, and at a certain magnification (for example, 500 times), the respective thickness of the first negative electrode film and the second negative electrode film are read in the measuring area of the ruler, and then the average value of the test results from several test areas are taken as the average thickness of the first negative electrode film and the second negative electrode film.

In this application, the areal density of the negative electrode film has a common meaning in this field and can be tested using methods known in this field. For example, take the negative electrode plate subjected to a single-side coating and cold pressing, (if the negative electrode plate is coated on both sides, the negative electrode film on one side can be wiped off firstly), cut it into small disks with an area of S1, and get the weight recorded as M1. Then the negative electrode film of the weighed negative electrode plate is wiped off and the negative electrode current collector is weighed and recorded as M0. The areal density of the negative electrode film is determined by the formula of (weight of negative electrode plate M1−weight of negative electrode current collector M0)/S1. To ensure the accuracy of the test results, multiple (such as 10) of test samples may be tested, and the average value is calculated as the test results.

The compacted density of negative electrode film has a common meaning in this field and can be tested by methods already known in this field. For example, the areal density and thickness of negative electrode film could be obtained according to the above test method, and the compacted density of negative electrode film=areal density of negative electrode film/thickness of negative electrode film.

In the secondary battery of the present application, the first negative electrode film and/or the second negative electrode film generally contains a negative electrode active material, and an optional binder, an optional conductive agent, and other optional auxiliaries, and is generally formed by coating and drying a negative electrode film slurry. The negative electrode film slurry is generally formed by dispersing the negative electrode active material and optionally a conductive agent, a binder, and the like in a solvent, such as N-methylpyrrolidone (NMP) or deionized water, with stirring uniformly. Other optional auxiliaries may be, for example, thickening and dispersing agents (e.g. sodium carboxyl methylcellulose, CMC—Na), PTC thermistor materials, and the like.

As an example, the conductive agent may include one or more of the superconducting carbon, acetylene black, carbon black, Ketjen black, carbon dots, carbon nanotubes, graphene, and carbon nanofibers.

As an example, the binder may include one or more of the styrene-butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA) and polyvinyl butyral (PVB).

In the secondary battery of the present application, the first negative electrode active material and/or the second negative electrode active material may optionally include a certain amount of other common negative electrode active materials, such as one or more of natural graphite, soft carbon, hard carbon, silicon-based materials, tin-based materials, and lithium titanate, in addition to the specific negative electrode active material described above. The silicon-based material can be one or more selected from the elemental silicon, silicon-oxygen compound, silicon carbon composite and silicon alloy. The tin-based material can be one or more selected from elemental tin, tin oxygen compound, and tin alloys. Methods for preparing these materials are well known and these materials are commercially available. Technicians in this field can make appropriate choices based on the actual application environment.

In the secondary battery of this application, the negative electrode current collector may adopt conventional metal foil or a composite electrode current collector in which the metal material may be arranged on the polymer substrate to form the composite electrode current collector. As an example, the negative electrode current collector can use copper foil.

It should be understood that the negative electrode current collector has two opposite surfaces in the direction of its thickness. The negative electrode film can be arranged on either or both of the two opposite surfaces of the negative electrode current collector.

Figure 2:
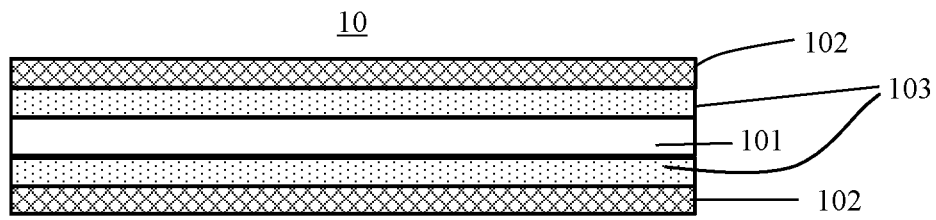
FIG. 2 shows a schematic diagram of an embodiment of a negative electrode plate of a secondary battery in this application.

FIG. 2 shows the schematic diagram of an embodiment of the negative electrode plate 10 in this application. The negative electrode plate 10 is composed of the negative electrode current collector 101, the first negative electrode film 103 arranged on the two surfaces of the negative electrode current collector, and the second negative electrode film 102 arranged on the first negative electrode film 103.

Figure 3:
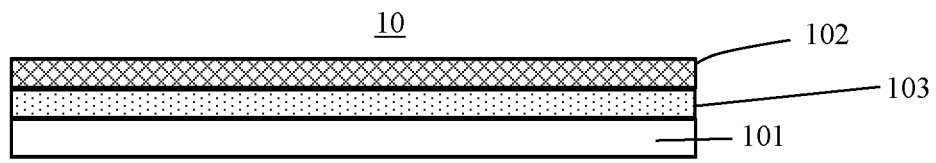
FIG. 3 shows a schematic diagram of another embodiment of a negative electrode plate of a secondary battery in this application.

FIG. 3 shows the schematic diagram of another embodiment of the negative electrode plate 10 in this application. The negative electrode plate 10 is composed of the negative electrode current collector 101, the first negative electrode film 103 arranged on one surface of the negative electrode current collector, and the second negative electrode film 102 arranged on the first negative electrode film 103.

It shall be noted that each negative electrode film parameter, such as thickness, areal density, compacted density of the negative electrode film given in the present application refers to a parameter range of a single-side film. If the negative electrode film is located on both surfaces of the negative electrode current collector, and the film parameter on either surface satisfies this application, it is deemed to fall within the protection area of this application. The scope of the film thickness, areal density and compacted density mentioned in this application refer to the film parameters of the assembly battery after cold pressing.

In addition, in the secondary battery of the present application, the negative electrode plate does not exclude other additional functional layers than the negative electrode film. For example, in certain embodiments, the negative electrode plate described herein further comprises a conductive primer layer (e.g., consisting of a conductive agent and a binder) disposed on the surface of the current collector, sandwiched between the current collector and the first film. In some other embodiments, the negative electrode plate further includes a protective cover layer covering the surface of the second film.

[Positive Electrode Plate]

In the secondary battery of this application, the positive electrode plate comprises a positive electrode current collector and a positive electrode film arranged on at least one surface of the positive electrode current collector and comprising a positive active material.

It should be noted that the positive electrode current collector has two opposite surfaces in the direction of its thickness. The positive electrode film may be laminated on either or both of the two opposite surfaces of the positive electrode current collector.

In the secondary battery of this application, the positive electrode current collector may adopt conventional metal foil or a composite electrode current collector in which the metal material can be set on the polymer substrate to form the composite electrode current collector. As an example, the positive electrode current collector may adopt the aluminum foil.

In the secondary battery of this application, the positive active material may include one or more of lithium transition metal oxides, lithium phosphates of olivine structure and their respective modified compounds. Examples of lithium transition metal oxides may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and their modified compounds. Examples of lithium phosphates in olivine structures may include, but may not be limited to, one or more of lithium iron phosphate, a composite of lithium iron phosphate with carbon, lithium manganese phosphate, a composite of lithium manganese phosphate with carbon, lithium iron manganese phosphate, a composite of lithium iron manganese phosphate with carbon and their modified compounds. This application is not limited to these materials, but may also adopt other conventional and common materials that can be used as positive active materials for secondary batteries.

In some preferred embodiments, in order to further increase the energy density of the battery, the positive active material may include one or more of a lithium transition metal oxide represented by Formula 1 and the modified compounds thereof,

   Formula 1, in which, $0.8 \leq a \leq 1.2$, $0.5 \leq b<1$, $0<c<1$, $0<d<1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S, and Cl.

In this application, the modified compounds of above-mentioned materials may be compounds obtained by doping and/or surface coating of materials for modification.

In the secondary battery of this application, the positive electrode film also optionally comprises a binder and a conductive agent.

As an example, the binder for the positive electrode film may include one or more of polyvinylidene fluoride (PVDF) and polytetrafluoroethylene (PTFE).

As an example, the conductive agent for the positive electrode film may include one or more of superconducting carbon, acetylene black, carbon black, Ketjen black, carbon dot, carbon nanotube, graphene and carbon nanofiber.

[Electrolyte]

Electrolytes act as conducting ions between positive and negative electrode plates. This application has no specific limitation on the type of electrolyte, which may be selected according to requirements. For example, electrolytes may be at least one selected from solid and liquid electrolytes (i.e. electrolyte solution).

In some embodiments, electrolyte adopts electrolyte solution. Electrolyte solution includes an electrolyte salt and a solvent. In some embodiments, the electrolyte salt can be one or more selected from LiPF$_6$ (Lithium Hexafluorophosphate), LiBF$_4$ (Lithium Tetrafluoroborate), LiClO$_4$ (Lithium Perchlorate), LiAsF$_6$ (Lithium Hexafluoroarsenate), LiFSI (Lithium Bisfluorosulfonimide), LiTFSI (Lithium Bis(trifluoromethanesulfonyl)imide), LiTFS (Lithium Trifluoromethanesulfonate), LiDFOB (Lithium Difluoro(oxalate)borate), LiBOB (Lithium Bis(oxalate)borate), LiPO$_2$F$_2$ (Lithium Difluorophosphate), LiDFOP (Lithium Difluorodioxalate phosphate) and LiTFOP (Lithium Tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluorinated ethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulphide (EMS), and ethyl sulfonyl ethanol (ESE).

In some embodiments, additives are also optionally included in the electrolyte solution. For example, additives may include negative electrode film forming additives, or positive electrode film forming additives, as well as additives that can improve some performances of batteries, such as additives that improve battery overcharge performance, additives that improve high-temperature performance, and additives that improve low-temperature performance.

[Separator]

Secondary batteries using electrolytes, as well as some secondary batteries using solid-state electrolytes, also include a separator. The separator is arranged between the positive electrode plate and the negative electrode plate for isolation. This application has no special limitation on the type of separator. Any common porous separator with good chemical and mechanical stability can be selected.

In some embodiments, the material of the separator may adopt one or more selected from glass fibers, non-woven fabrics, polyethylene, polypropylene and polyvinylidene fluoride. The separator can be either a single-layer film or a multi-layer composite film. When the separator is a multi-layer composite film, the materials of each layer may be the same or different.

In some embodiments, an electrode assembly can be made by winding or laminating the positive electrode plate, negative electrode plate and separator.

In some embodiments, the secondary battery may include an external package. The external package can be used to encapsulate the electrode assembly and electrolyte.

In some embodiments, the external package of the secondary battery may be a hard shell, such as hard plastic shell, aluminum shell, and steel shell. The external package of the secondary battery can also be a soft pack, such as a bag-type soft pack. The soft pack may be made of plastics such as one or more of polypropylene (PP), polybutylene terephthalate (PBT), polybutylene succinate (PBS), and the like.

This application has no special limitation on the shape of the secondary battery, which may be cylindrical, square or any other arbitrary shape. FIG. 1 shows a secondary battery 5 with a square-shaped structure as an example.

Figure 4:
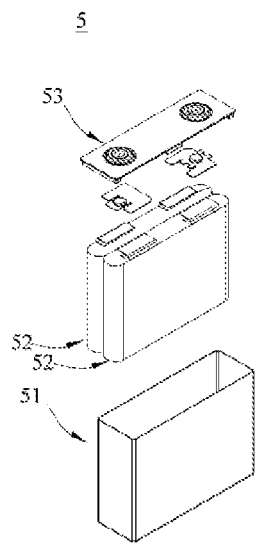
FIG. 4 shows a decomposition diagram of an embodiment of a secondary battery in this application.

In some embodiments, the external package may include house 51 and cover plate 53, as shown in FIG. 4. House shell 51 may include the bottom plate and the side plate attached to the bottom plate. The bottom plate and the side plate are enclosed to form an accommodation chamber. House 51 has an opening communicating with the accommodation chamber, and cover plate 53 is used to cover the opening to close the accommodation chamber. The positive electrode plate, the negative electrode plate and the separator can form an electrode assembly 52 by winding or laminating process. The electrode assembly 52 is encapsulated in the accommodation chamber. The electrode assembly 52 is infiltrated by the electrolyte solution. The number of electrode assemblies 52 contained in the secondary battery 5 may be one or more, and may be adjusted according to requirements.

In some embodiments, the secondary batteries can be assembled into a battery module. The number of secondary batteries in the battery module can be more than one. The specific number can be adjusted according to the application and capacity of the battery module.

Figure 5:
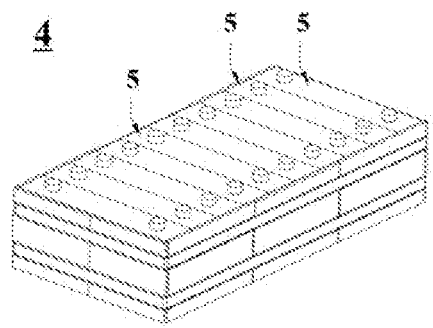
FIG. 5 shows a schematic diagram of an embodiment of a battery module.

FIG. 5 shows the battery module 4 as an example. With reference to FIG. 5, in the battery module 4, multiple secondary batteries 5 may be arranged in sequence along the length direction of battery module 4. Of course, it can also be arranged in any other ways. Further, the multiple secondary batteries 5 can be fixed by fasteners.

Optionally, the battery module 4 can also include a house with the accommodation space, in which multiple secondary batteries 5 are accommodated.

In some embodiments, the battery modules can also be assembled into a battery pack. The number of battery modules contained in the battery pack can be adjusted according to the application and capacity of the battery pack.

Figure 6:
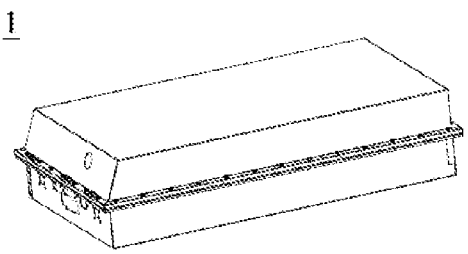
FIG. 6 shows a schematic diagram of an embodiment of a battery pack.
Figure 7:
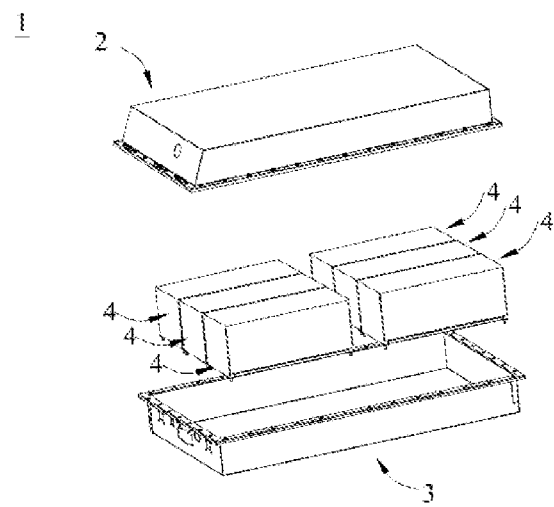
FIG. 7 is an exploded diagram of FIG. 6.

FIGS. 6 and 7 are of the battery pack 1 as an example. With reference to FIG. 6 and FIG. 7, the battery pack 1 may include a battery cabinet body and multiple battery modules 4 set in the battery cabinet body. The battery cabinet body comprises an upper cabinet body 2 and a lower cabinet body 3, wherein the upper cabinet body 2 is used to cover the lower cabinet body 3 and form a closed space for accommodating the battery module 4. Multiple battery modules 4 can be arranged in any way in the battery cabinet body.

Process for Preparing Secondary Batteries

In the second aspect of this application, a process for preparing a secondary battery is provided, including preparing a negative electrode plate of the secondary battery by the following steps:

1) forming a first negative electrode film comprising a first negative electrode active material on at least one surface of a negative electrode current collector, wherein the first negative electrode active material comprises graphite and has a particle size uniformity of from 0.4 to 0.6; and 2) forming a second negative electrode film comprising a second negative electrode active material on the first negative electrode film, wherein the second negative electrode active material comprises artificial graphite; and the second negative electrode active material has a particle size uniformity of from 0.25 to 0.45.

In the process for preparing the secondary battery, the first negative electrode film and the second negative electrode film can be coated at the same time in one step, and can also be coated twice.

In some preferred embodiments, the first and second negative electrode films are simultaneously coated at one time. The first and second negative electrode films can be better bonded by coating in one step, which may further improve the cycle performance of the battery.

In addition to the process for preparing the negative electrode plate of the present application, other configurations and preparation processes of the secondary battery of the present application are known per se. For example, the positive plate of the present application can be prepared as follows: mixing an positive active material, optional conductive agents (such as carbon materials for example carbon black) and binders (such as PVDF) and the like, dispersing the mixture into a solvent (such as NMP), uniformly stirring, coating the mixture on a positive current collector, and drying to obtain a positive plate. Material such as aluminum foil or porous metal plate can be used as a positive electrode current collector. When the positive plate is manufactured, a positive tab can be obtained in the uncoated area of the positive current collector through modes of punching or laser die cutting and the like.

Finally, the positive electrode plate, the separator and the negative electrode plate can be stacked in order so that the separator is disposed between the positive and negative electrode plates works for isolation, and then the electrode assembly can be obtained by a winding or laminating process; the battery assembly is placed in an external package, in which the electrolyte solution is injected when it is dried. After that, the processes of vacuum packing, steady standing, formatting, and shaping are carried out, thereby obtaining a secondary battery is then obtained through. According to the secondary battery, the positive plate, the negative electrode plate and the separator can be manufactured into an electrode assembly with a winding structure through a winding process, and can be manufactured into an electrode assembly with a laminated structure through a lamination process.

Apparatus

An apparatus is provided in the third aspect of this application. The apparatus comprises a secondary battery according to the first aspect of the present application or comprises a secondary battery prepared by the process according to the second aspect of the present application. The secondary battery can be used as the power source of the apparatus or as the energy storage unit of the apparatus. The apparatus in this application uses the secondary battery provided in this application and thus has at least the same advantages as the secondary battery.

The apparatus can be, but is not limited to, a mobile apparatus (such as mobile phone, laptop, etc.) or an electric vehicle (such as pure electric vehicle, hybrid electric vehicle, plug-in hybrid electric vehicle, electric bicycle, electric scooter, electric golf cart, electric truck, etc.), electric train, ship and satellite, energy storage system, etc.

The apparatus may adopt the secondary battery, battery module or battery pack according to its application requirement.

Figure 8:
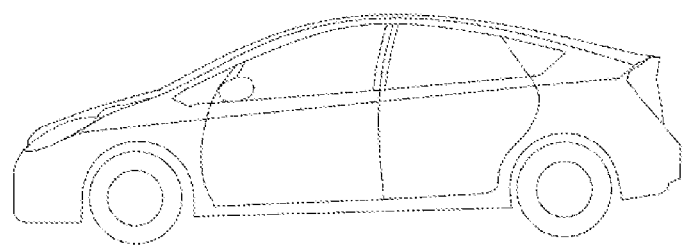
FIG. 8 shows a schematic diagram of an embodiment of an apparatus in this application that applies the secondary battery as a power source.

FIG. 8 shows an apparatus as an example. The apparatus is may be pure electric vehicle, hybrid electric vehicle, or plug-in electric hybrid electric vehicle and so on. To meet the requirements of the apparatus for the high rate and high energy density of secondary batteries, the battery pack or battery module can be used.

The apparatus, as another example, may be mobile phone, tablet PC, laptop, and the like. The apparatus is usually required to be lightweight and can be powered by the secondary battery.

The beneficial effects of this application are further described in combination with the examples as follows.

EXAMPLES

To make the invention purpose, technical solution and beneficial technical effects of this application clearer, this application is further described in combination with the examples as follows. However, it should be understood that the examples of this application is intended only to explain this application, but not to restrict this application, and that the example of this application is not limited to the examples given in the specification. The test conditions or operating conditions not specified in the examples shall be made according to normal conditions or as recommended by the material supplier.

I. Preparation of Secondary Batteries

Example 1

1) Preparation of Positive Electrode Plate

Lithium nickel cobalt manganese ternary active material $LiNi_{0.8}Co_{0.1}Mn_{0.1}O_2$ (NCM 811), carbon black (Super-P) as a conductive agent and polyvinylidene fluoride (PVDF) as a binder in a weight ratio of 94:3:3 were mixed in an N-methylpyrrolidone solvent (NMP) with stirring homogeneously, thereby obtaining a slurry. The slurry was coated on an aluminum foil current collector to obtain a positive electrode plate after drying, cold pressing, splitting, cutting and the like and then the uncoated area on the positive electrode current collector was punched out to form a positive electrode tab. The areal density of the positive electrode film was 17.3 mg/cm$^2$ and the compacted density was 3.5 g/cm$^3$.

2) Preparation of Negative Electrode Plate

Step one, preparing negative slurry 1: a first negative electrode active material (see table 1 for details), a binder SBR, a thickener sodium carboxyl methylcellulose (CMC—Na) and a conductive agent carbon black (Super-P) at a weight ratio of 96.2:1.8:1.2:0.8 with deionized water were added to a stirring tank in a certain order for mixing to prepare the negative slurry 1, wherein the first negative active material had a particle size uniformity of 0.43;

Step two, preparing negative slurry 2: a second negative electrode active material (see table 1 for details), a binder SBR, a thickener sodium carboxyl methylcellulose (CMC—Na), a conductive agent carbon black (Super-P) at a ratio of 96.2:1.8:1.2:0.8 with deionized water 15 were added to a stirring tank in a certain order for mixing to prepare negative slurry 2 wherein the second negative electrode active material had a particle size uniformity of 0.35, and the number ratio of secondary particles in the second negative electrode active material was 95%;

Step three, the negative slurry 1 and negative slurry 2 were extruded at the same time through a dual-cavity coating apparatus. Negative slurry 1 was coated on a copper foil current collector to form a first negative electrode film, and the negative slurry 2 was coated on the first negative electrode film to form a second negative electrode film. Areal density of the negative electrode film is 11.0 mg/cm$^2$; and Step four, the coated wet film was baked through an oven at different temperature areas to 25 obtain a dried plate, which was subjected to cold pressing to obtain a required negative electrode film, wherein the compacted density of the negative electrode film was 1.65 g/cm$^3$. After that, striping, cutting and the like were performed to obtain a negative electrode plate. A negative tab was punched out in an uncoated area on a negative current collector.

3) Separator

PE film was selected as separator.

4) Preparation of electrolyte solution

Ethylene carbonate (EC), methyl ethyl carbonate (EMC) and diethyl carbonate (DEC) were mixed according to a volume ratio of 1:1:1. Then the fully dried lithium salt $LiPF_6$ was dissolved into the mixed organic solvent at the ratio of 1 mol/L to prepare an electrolyte solution.

5) Preparation of Battery

The positive plate, the separator and the negative electrode plate described as above were sequentially stacked, with a reference electrode (that is used for detecting the performance of the battery sample, can be selected from a lithium plate, a lithium metal wire and the like, and shall be separated by the separator from contacting with any one side of the positive electrode and negative electrode) incorporated between the separator and the negative electrode plate, which were wound into an electrode assembly. The electrode assembly was packed into an outer package in which the electrolyte was added, followed by packaging, standing, formation, aging and the like, thereby obtaining a secondary battery.

The preparation process of secondary batteries of Examples 2 to 19 and Comparative Examples 1 to 6 was similar to that of Example 1, with the exception that the composition of negative electrode plate and product parameters were adjusted. The different product parameters were shown in Table 1 and Table 2.

II. Test Methods for Performance Parameters

1 Quick Charging Performance Test

At 25° C., the secondary batteries prepared in the above examples and comparative examples were charged and discharged for the first time at a current of 1 C (i.e., the current value at which the theoretical capacity is completely discharged within 1 h), including: constant-current charging the battery to a charging cutoff voltage V1 at a rate of 1 C, then constant-voltage charging the battery to a current≤0.05 C, standing for 5 min, and then constant-current discharging the battery to a discharging cutoff voltage V2 at a rate of 0.33 C, and recording its actual capacity as $C_0$.

Then, constant-current charging of the battery was carried out to arrive at a full-cell charging cut-off voltage V1 or 0V negative cut-off potential whichever comes first by using 0.5 $C_0$, 1 $C_0$, 1.5 $C_0$, 2 $C_0$, 2.5 $C_0$, 3 $C_0$, 3.5 $C_0$, 4 $C_0$ and 4.5 $C_0$ in sequence. After each charging was completed, the battery was required to be discharged to a full battery discharge cut-off voltage V2 at 1 $C_0$, and the negative potentials when the battery was charged to 10%, 20%, 30%, . . . and 80% SOC (State of Charge) under different charging rates were recorded, which were plotted as a curve of charging rate-negative potential under different 5 SOC states. By linear fitting, the charging rates when the negative potential was 0V under different SOC states were obtained, the charging rates were a charging window under the SOC State recorded as $C_{10\%SOC}$, $C_{20\%SOC}$, $C_{30\%SOC}$, $C_{40\%SOC}$, $C_{50\%SOC}$, $C_{60\%SOC}$, $C_{70\%SOC}$, $C_{80\%SOC}$, and the charging time T in min of the battery from 10% SOC to 80% SOC was calculated based on the following formula $(60/C_{10\%SOC}+60/C_{20\%SOC}+60/C_{30\%SOC}+60/C_{40\%SOC}+60/C_{50\%SOC}+60/C_{60\%SOC}+60/C_{70\%SOC}+60/C_{80\%SOC})\times10\%$.

The shorter the time, the more excellent the quick charging performance of the battery is.

2 Cycle Performance Test

The secondary batteries prepared in the above examples and comparative examples were subjected to first charging and discharging at 25° C. with a current of 1 C (i.e., a current value at which the theoretical capacity is completely discharged within 1 h), in which the charging was a constant-current constant-voltage charge, the end voltage was 4.2V, the cut off current was 0.05 C, and the discharge end voltage was 2.8V, and the discharge capacity Cb of the battery at the first cycle was recorded. The battery was then subjected to 1 C/1 C cycle test, and the discharge capacity Ce of the battery at any time was recorded. The ratio of Ce to Cb was the cycle capacity retention rate. When the cycle capacity retention rate was equal to 80%, stop the test and record the cycle number.

III. Test Results for Examples and Comparative Examples

In accordance with the above process, batteries of each example and comparative example were prepared, and the performance parameters were measured. The results were shown in Table 1 and Table 2 as below.

TABLE 1

| Serial number | Type and mass ratio of the first negative electrode active material | Particle size uniformity of the first negative active material | Type and mass ratio of the second negative electrode active material | Particle size uniformity of the second negative active material | Ratio of uniformity of the first negative electrode active material to the second negative electrode active material | Quick charging performance (min) | Cycle performance |
|---|---|---|---|---|---|---|---|
| Example 1 | 100% artificial graphite | 0.43 | 100% artificial graphite | 0.35 | 1.23 | 20.7 | 1639 |
| Example 2 | 100% artificial graphite | 0.47 | 100% artificial graphite | 0.35 | 1.34 | 19.3 | 1768 |
| Example 3 | 100% artificial graphite | 0.51 | 100% artificial graphite | 0.35 | 1.46 | 18.5 | 1825 |
| Example 4 | 100% artificial graphite | 0.55 | 100% artificial graphite | 0.35 | 1.57 | 19.1 | 1934 |
| Example 5 | 100% artificial graphite | 0.58 | 100% artificial graphite | 0.35 | 1.66 | 20.3 | 1624 |
| Example 6 | 100% artificial graphite | 0.53 | 100% artificial graphite | 0.27 | 1.96 | 21.5 | 1409 |
| Example 7 | 100% artificial graphite | 0.53 | 100% artificial graphite | 0.32 | 1.66 | 19.5 | 1603 |
| Example 8 | 100% artificial graphite | 0.53 | 100% artificial graphite | 0.35 | 1.51 | 18.9 | 1795 |
| Example 9 | 100% artificial graphite | 0.53 | 100% artificial graphite | 0.38 | 1.39 | 18.6 | 1806 |
| Example 10 | 100% artificial graphite | 0.53 | 100% artificial graphite | 0.43 | 1.23 | 20.4 | 1735 |
| Example 11 | 80% of artificial graphite and 20% of natural graphite | 0.53 | 100% artificial graphite | 0.35 | 1.51 | 18.2 | 1701 |
| Example 12 | 60% of artificial graphite and +40% of natural graphite | 0.57 | 100% artificial graphite | 0.35 | 1.63 | 17.9 | 1513 |
| Example 13 | 100% natural graphite | 0.48 | 100% artificial graphite | 0.35 | 1.37 | 23.8 | 1324 |
| Example 14 | 100% artificial graphite | 0.53 | 98% artificial graphite + 2% silicon monoxide | 0.35 | 1.51 | 18.7 | 1575 |
| Comparative example 1 | 100% artificial graphite | 0.53 | 100% artificial graphite | 0.23 | 2.30 | 26.1 | 730 |
| Comparative example 2 | 100% artificial graphite | 0.53 | 100% artificial graphite | 0.51 | 1.04 | 28.3 | 485 |

TABLE 1-continued

| Serial number | Type and mass ratio of the first negative electrode active material | Particle size uniformity of the first negative electrode active material | Type and mass ratio of the second negative electrode active material | Particle size uniformity of the second negative electrode active material | Ratio of uniformity of the first negative electrode active material to the second negative electrode active material | Quick charging performance (min) | Cycle performance |
|---|---|---|---|---|---|---|---|
| Comparative example 3 | 100% artificial graphite | 0.36 | 100% artificial graphite | 0.35 | 1.03 | 27.8 | 673 |
| Comparative example 4 | 100% artificial graphite | 0.65 | 100% artificial graphite | 0.35 | 1.86 | 25.1 | 589 |
| Comparative example 5 | 100% natural graphite | 0.48 | 100% artificial graphite | 0.24 | 2.00 | 26.5 | 627 |
| Comparative example 6 | 100% natural graphite | 0.48 | 100% artificial graphite | 0.47 | 1.02 | 29.3 | 471 |

TABLE 2

| Serial number | Type of the first negative electrode active material | Uniformity of the first negative electrode active material | Type of the second negative electrode active material | Uniformity of the second negative electrode active material | Morphology of the second negative electrode active material | Quick charging performance (minute) | Cycle performance |
|---|---|---|---|---|---|---|---|
| Example 14 | 100% artificial graphite | 0.53 | 100% artificial graphite | 0.35 | The number of the secondary particles accounts for 85% | 19.3 | 1713 |
| Example 15 | 100% artificial graphite | 0.53 | 100% artificial graphite | 0.35 | The number of the secondary particles accounts for 70% | 18.2 | 1830 |
| Example 16 | 100% artificial graphite | 0.53 | 100% artificial graphite | 0.35 | The number of the secondary particles accounts for 50% | 18.5 | 1765 |
| Example17 | 100% artificial graphite | 0.53 | 100% artificial graphite | 0.35 | The number of the secondary particles accounts for 30% | 19.6 | 1656 |
| Example 18 | 100% artificial graphite | 0.53 | 100% artificial graphite | 0.35 | The number of the secondary particles accounts for 15% | 20.1 | 1567 |
| Example 19 | 100% artificial graphite | 0.53 | 100% artificial graphite | 0.35 | The number of the secondary particles accounts for 3% | 21.3 | 1489 |

First, it was shown from the data of examples 1 to 13 and comparative examples 1 to 6 that: when the particle size uniformity of the first negative electrode active material was less than 0.4 or more than 0.6, or when the particle size uniformity of the second negative electrode active material was less than 0.25 or more than 0.45, the battery could not simultaneously satisfy the quick charging performance and the cycle performance both, especially the cycle performance was poor. When the particle size uniformity of the first negative electrode active material was from 0.4 to 0.6 and the particle size uniformity of the second negative electrode active material was from 0.25 to 0.45, the battery had good quick charging performance and cycle performance. To balance the quick charging performance and the cycle performance of batteries, the particle size uniformity of the first negative electrode active material was preferably from 0.45 to 0.6, and more preferably from 0.5 to 0.57; the particle size uniformity of the second negative electrode active material preferably was from 0.3 to 0.4, and more preferably from 0.32 to 0.38.

In addition, it was shown from the data of examples 1 to 13 and comparative examples 1 to 6 that there was a preferred range for the ratio of the particle size uniformity of the first negative electrode active material to the particle size uniformity of the second negative electrode active material; when the ratio was from 1.05 to 1.9, and more preferably from 1.2 to 1.6, the overall performance of the battery was better.

In addition, it was shown from comparison of examples 14 to 19 that when the particle size uniformity of the first negative electrode active material was from 0.4 to 0.6 and the particle size uniformity of the second negative electrode active material was from 0.25 to 0.45, the ratio of the number of secondary particles in the second negative electrode active material had a certain effect on the battery performance. Especially, when the number ratio B of the secondary particles in the second negative electrode active material was ≥30%, the quick charging performance and cycle performance of the battery were greatly improved.

Below are some exemplary embodiments of the present application.

Embodiment 1. A secondary battery, comprising a negative electrode plate, the negative electrode plate comprising a negative electrode current collector and a negative electrode film, and the negative electrode film comprising a first negative electrode film and a second negative electrode film, wherein the first negative electrode film is disposed on at least one surface of the negative electrode current collector and comprises a first negative electrode active material, and the first negative electrode active material comprises graphite and has a particle size uniformity of from 0.4 to 0.6; and the second negative electrode film is disposed on the first negative electrode film and comprises a second negative electrode active material, and the second negative electrode active material comprises artificial graphite and has a particle size uniformity of from 0.25 to 0.45.

Embodiment 2. The secondary battery according to Embodiment 1, wherein the first negative electrode active material has a particle size uniformity of from 0.45 to 0.6, preferably from 0.5 to 0.57.

Embodiment 3. The secondary battery according to any one of Embodiments 1-2, wherein the second negative electrode active material has a particle size uniformity of from 0.3 to 0.4, preferably from 0.32 to 0.38.

Embodiment 4. The secondary battery according to any one of Embodiments 1-3, wherein a ratio of the particle size uniformity of the first negative electrode active material to the particle size uniformity of the second negative electrode active material is from 1.05 to 1.9, preferably from 1.2 to 1.6.

Embodiment 5. The secondary battery according to any one of Embodiments 1-4, wherein the second negative electrode active material comprises secondary particles, and a number percentage of the secondary particles in the secondary negative electrode active material satisfies ≥30%; preferably, a number percentage of the secondary particles in the secondary negative electrode active material satisfies ≥50%.

Embodiment 6. The secondary battery according to any one of Embodiments 1-5, wherein a mass percentage of the artificial graphite in the second negative electrode active material satisfies ≥50%, preferably from 90% to 100%.

Embodiment 7. The secondary battery according to any one of Embodiments 1-6, wherein the first negative electrode active material has a volume distribution particle size $D_V10$ less than the second negative electrode active material.

Embodiment 8. The secondary battery according to any one of Embodiments 1-7, wherein the first negative electrode active material has a tap density greater than the second negative electrode active material.

Embodiment 9. The secondary battery according to any one of Embodiments 1-8, wherein the first negative electrode active material further satisfies one or more of the following (1)-(6):
(1) the first negative electrode active material has a volume distribution particle size $D_V10$ of from 4.8 μm to 8.0 μm, preferably from 5.3 μm to 7.3 μm;
(2) the first negative electrode active material has a volume distribution particle size $D_V50$ of from 13.7 μm to 20.7 μm, preferably from 14.7 μm to 18.7 μm;
(3) the first negative electrode active material has a volume distribution particle size $D_V99$ of from 42 μm to 66 μm, preferably from 48 μm to 60 μm;
(4) the first negative electrode active material has a particle size distribution $(D_V90-D_V10)/D_V50$ of from 1.2 to 2.4, preferably from 1.5 to 2.1;
(5) the first negative electrode active material has a tap density of from 0.88 $g/cm^3$ to 1.28 $g/cm^3$, preferably from 0.98 $g/cm^3$ to 1.18 $g/cm^3$; and
(6) the first negative electrode active material has a powder compacted density of from 1.77 $g/cm^3$ to 1.97 $g/cm^3$ at a pressure of 30,000N, preferably from 1.82 $g/cm^3$ to 1.92 $g/cm^3$.

Embodiment 10. The secondary battery according to any one of Embodiments 1-9, wherein the second negative electrode active material further satisfies one or more of the following (1)-(6):

(1) the second negative electrode active material has a volume distribution particle size $D_V10$ of from 6.0 μm to 9.5 μm, preferably from 8 μm to 9 μm;
(2) the second negative electrode active material has a volume distribution particle size $D_V50$ of from 10 μm to 18 μm, preferably from 12 μm to 16 μm;
(3) the second negative electrode active material has a volume distribution particle size $D_V99$ of from 25 μm to 45 μm, preferably from 30 μm to 40 μm;
(4) the second negative electrode active material has a particle size distribution $(D_V90-D_V10)/D_V50$ of from 0.9 to 1.5, preferably from 1.1 to 1.3;
(5) the second negative electrode active material has a tap density of from 0.7 $g/cm^3$ to 1.4 $g/cm^3$, preferably from 0.8 $g/cm^3$ to 1.2 $g/cm^3$, and
(6) the second negative electrode active material has a powder compacted density of from 1.65 $g/cm^3$ to 1.85 $g/cm^3$ at a pressure of 30,000N, preferably from 1.71 $g/cm^3$ to 1.80 $g/cm^3$.

Embodiment 11. The secondary battery according to any one of Embodiments 1-10, wherein the first negative electrode active material comprises one or more of artificial graphite and natural graphite.

Embodiment 12. The secondary battery according to any one of Embodiments 1-11, wherein the first negative electrode active material comprises artificial graphite and the artificial graphite constitutes ≥50% by mass of the first negative electrode active material, preferably from 60% to 100% by mass.

Embodiment 13. The secondary battery according to any one of Embodiments 1-12, wherein the negative electrode film further satisfies one or more of the following (1)-(3):
(1) the negative electrode film has a areal density of from 90 $g/m^2$ to 136 $g/m^2$, preferably, from 104 $g/m^2$ to 117 $g/m^2$;
(2) the negative electrode film has a compacted density of from 1.5 $g/cm^3$ to 1.75 $g/cm^3$, preferably from 1.6 $g/cm^3$ to 1.7 $g/cm^3$; and
(3) the negative electrode film has a thickness of ≥60 μm, preferably from 65 μm to 80 μm.

Embodiment 14. A process for preparing a secondary battery, comprising preparing a negative electrode plate of the secondary battery by the following steps:
1) forming a first negative electrode film comprising a first negative electrode active material on at least one surface of a negative electrode current collector, wherein the first negative electrode active material comprises graphite and has a particle size uniformity of from 0.4 to 0.6; and
2) forming a second negative electrode film comprising a second negative electrode active material on the first negative electrode film, wherein the second negative electrode active material comprises artificial graphite; and the second negative electrode active material has a particle size uniformity of from 0.25 to 0.45.

Embodiment 15. An apparatus, comprising the secondary battery according to any one of Embodiments 1-13 or the secondary battery manufactured by the process according to Embodiment 14.

It should also be supplemented that according to the disclosure and guidance of the above-mentioned specifications, those skilled in the art may also make appropriate changes and modifications to the above-mentioned examples. Therefore, this application is not limited to the specific examples disclosed and described above, and some modifications and changes to this application fall within the scope of protection of the claims of this application. In addition, although a number of specific terms are used in this specification, these terms are intended for convenience only and do not constitute any restriction on this application.

What is claimed is:

1. A secondary battery, comprising a negative electrode plate, the negative electrode plate comprising a negative electrode current collector and a negative electrode film, and the negative electrode film comprising a first negative electrode film and a second negative electrode film, wherein the first negative electrode film is disposed on at least one surface of the negative electrode current collector and comprises a first negative electrode active material, and the first negative electrode active material comprises graphite and has a particle size uniformity of from 0.4 to 0.6; and the second negative electrode film is disposed on the first negative electrode film and comprises a second negative electrode active material, and the second negative electrode active material comprises artificial graphite and has a particle size uniformity of from 0.25 to 0.45; and a ratio of the particle size uniformity of the first negative electrode active material to the particle size uniformity of the second negative electrode active material is from 1.05 to 1.9;

the first negative electrode active material has a volume distribution particle size $D_v50$ of from 13.7 μm to 20.7 μm; and the second negative electrode active material has a volume distribution particle size $D_v50$ of from 10 μm to 18 μm; and the first negative electrode active material comprises one or more of artificial graphite or natural graphite.

2. The secondary battery according to claim 1, wherein the first negative electrode active material has a particle size uniformity of from 0.45 to 0.6.

3. The secondary battery according to claim 2, wherein the first negative electrode active material has a particle size uniformity of from 0.5 to 0.57.

4. The secondary battery according to claim 1, wherein the second negative electrode active material has a particle size uniformity of from 0.3 to 0.4.

5. The secondary battery according to claim 4, wherein the second negative electrode active material has a particle size uniformity of from 0.32 to 0.38.

6. The secondary battery according to claim 1, wherein a ratio of the particle size uniformity of the first negative electrode active material to the particle size uniformity of the second negative electrode active material is from 1.2 to 1.6.

7. The secondary battery according to claim 1, wherein the second negative electrode active material comprises primary particles and secondary particles, and a number percentage of the secondary particles in the second negative electrode active material satisfies≥30% to 100%.

8. The secondary battery according to claim 7, wherein the second negative electrode active material comprises primary particles and secondary particles, and a number percentage of the secondary particles in the second negative electrode active material satisfies≥50%.

9. The secondary battery according to claim 1, wherein a mass percentage of the artificial graphite in the second negative electrode active material satisfies ≥50% to 100%.

10. The secondary battery according to claim 9, wherein a mass percentage of the artificial graphite in the second negative electrode active material satisfies from 90% to 100%.

11. The secondary battery according to claim 1, wherein the first negative electrode active material has a volume distribution particle size $D_v10$ less than the second negative electrode active material.

12. The secondary battery according to claim 1, wherein the first negative electrode active material has a tap density greater than the second negative electrode active material.

13. The secondary battery according to claim 1, wherein the first negative electrode active material further satisfies one or more of the following (1) and (3)-(6):

(1) the first negative electrode active material has a volume distribution particle size $D_v10$ of from 4.8 μm to 8.0 μm;

(3) the first negative electrode active material has a volume distribution particle size $D_v99$ of from 42 μm to 66 μm;

(4) the first negative electrode active material has a particle size distribution $(D_v90-D_v10)/D_v50$ of from 1.2 to 2.4;

(5) the first negative electrode active material has a tap density of from 0.88 g/cm$^3$ to 1.28 g/cm$^3$; and (6) the first negative electrode active material has a powder compacted density of from 1.77 g/cm$^3$ to 1.97 g/cm$^3$ at a pressure of 30,000N.

14. The secondary battery according to claim 1, wherein the second negative electrode active material further satisfies one or more of the following (1) and (3)-(6):

(1) the second negative electrode active material has a volume distribution particle size $D_v10$ of from 6.0 μm to 9.5 μm;

(3) the second negative electrode active material has a volume distribution particle size $D_v99$ of from 25 μm to 45 μm;

(4) the second negative electrode active material has a particle size distribution $(D_v90-D_v10)/D_v50$ of from 0.9 to 1.5;

(5) the second negative electrode active material has a tap density of from 0.7 g/cm$^3$ to 1.4 g/cm$^3$; and (6) the second negative electrode active material has a powder compacted density of from 1.65 g/cm$^3$ to 1.85 g/cm$^3$ at a pressure of 30,000N.

15. The secondary battery according to claim 1, wherein the first negative electrode active material comprises artificial graphite and the artificial graphite constitutes≥50% to 100% by mass of the first negative electrode active material.

16. The secondary battery according to claim 15, wherein the first negative electrode active material comprises artificial graphite and the artificial graphite constitutes from 60% to 100% by mass of the first negative electrode active material.

17. The secondary battery according to claim 1, wherein the negative electrode film further satisfies one or more of the following (1)-(3):

(1) the negative electrode film has an areal density of from 90 g/m$^2$ to 136 g/m$^2$;

(2) the negative electrode film has a compacted density of from 1.5 g/cm$^3$ to 1.75 g/cm$^3$; and (3) the negative electrode film has a thickness of ≥60 μm to 80 μm.

18. An apparatus, comprising the secondary battery according to claim 1.

19. A process for preparing a secondary battery, comprising preparing a negative electrode plate of the secondary battery by the following steps:

1) forming a first negative electrode film comprising a first negative electrode active material on at least one surface of a negative electrode current collector, wherein the first negative electrode active material comprises graphite and has a particle size uniformity of from 0.4 to 0.6; and 2) forming a second negative electrode film comprising a second negative electrode active material on the first negative electrode film, wherein the second negative electrode active material comprises artificial graphite; and the second negative electrode active material has a particle size uniformity of from 0.25 to 0.45, wherein a ratio of the particle size uniformity of the first negative electrode active material to the particle size uniformity of the second negative electrode active material is from 1.05 to 1.9;

the first negative electrode active material has a volume distribution particle size $D_v50$ of from 13.7 μm to 20.7 μm; and the second negative electrode active material has a volume distribution particle size $D_v50$ of from 10 μm to 18 μm; and the first negative electrode active material comprises one or more of artificial graphite or natural graphite.

\* \* \* \* \*